US009253020B2

(12) United States Patent
Bhattacharyya et al.

(10) Patent No.: US 9,253,020 B2
(45) Date of Patent: Feb. 2, 2016

(54) WEB SERVICE INTERACTION IN A DYNAMICALLY EXTENSIBLE BUSINESS APPLICATION

(75) Inventors: Anamitra Bhattacharyya, Bedford, MA (US); Boris Dozortsev, Bedford, MA (US); Seenivasan Chandrasekararaja, Bedford, MA (US); Sampathkumar Sriramadhesikan, Bedford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1383 days.

(21) Appl. No.: 12/483,065

(22) Filed: Jun. 11, 2009

(65) Prior Publication Data

US 2010/0318370 A1 Dec. 16, 2010

(51) Int. Cl.
*G06F 3/00* (2006.01)
*H04L 12/24* (2006.01)
*H04L 29/08* (2006.01)

(52) U.S. Cl.
CPC ........ *H04L 41/0273* (2013.01); *H04L 41/0286* (2013.01); *H04L 41/0293* (2013.01); *H04L 67/02* (2013.01); *H04L 67/16* (2013.01); *H04L 41/5061* (2013.01)

(58) Field of Classification Search
CPC ............ H04L 41/0273; H04L 41/0286; H04L 41/0293; H04L 67/02; H04L 67/16
USPC .......................................... 719/330, 331, 332
See application file for complete search history.

(56) References Cited

U.S. PATENT DOCUMENTS

| 7,426,733 | B2 * | 9/2008 | Otake ........................... 719/310 |
| 7,437,710 | B2 * | 10/2008 | Bau et al. ...................... 717/117 |
| 7,743,391 | B2 * | 6/2010 | Balaji et al. ................... 719/328 |
| 7,802,230 | B1 * | 9/2010 | Mendicino et al. ........... 717/113 |
| 8,099,709 | B2 * | 1/2012 | Baikov et al. .................. 717/104 |
| 2002/0174178 | A1 * | 11/2002 | Stawikowski ................. 709/203 |
| 2004/0006653 | A1 * | 1/2004 | Kamen et al. ................. 709/330 |
| 2004/0015578 | A1 * | 1/2004 | Karakashian et al. ........ 709/223 |
| 2004/0068554 | A1 * | 4/2004 | Bales et al. .................... 709/218 |
| 2005/0120332 | A1 * | 6/2005 | Martin et al. .................. 717/105 |
| 2005/0125771 | A1 * | 6/2005 | Vitanov et al. ................ 717/104 |
| 2005/0132381 | A1 * | 6/2005 | Fiammante et al. .......... 719/310 |
| 2006/0150197 | A1 * | 7/2006 | Werner ......................... 719/316 |
| 2007/0073769 | A1 * | 3/2007 | Baikov .................... H04L 67/02 |
| 2007/0073771 | A1 * | 3/2007 | Baikov ...................... G06F 8/65 |
| 2007/0156839 | A1 * | 7/2007 | Batra et al. .................... 709/217 |
| 2008/0065653 | A1 * | 3/2008 | Shneur ............. G06F 17/30292 |

(Continued)

OTHER PUBLICATIONS

"Overview of WebSphere Adapter for Siebel Business Applications"; IBM WebSphere Adapter for Siebel, 6.1; http://publib.boulder.ibm.com/infocenter/dmndhelp/v6r1mx/topic/com.ibm.wsadapters.610.jca_siebel.doc/doc/cbp_sba_intro.html, Last updated Jan. 16, 2008.

(Continued)

*Primary Examiner* — Emerson Puente
*Assistant Examiner* — Willy W Huaracha
(74) *Attorney, Agent, or Firm* — Steven L. Nichols; Fabian VanCott (57) ABSTRACT

A method of binding a web service to a business application includes dynamically extending the executable code of the business application while the business application is being executed by a networked web service client device. The dynamic extension of the business application creates a persistent customizable web service interaction between the business application and a selected web service.

17 Claims, 7 Drawing Sheets

(56) References Cited

U.S. PATENT DOCUMENTS

| | | |
|---|---|---|
| 2008/0082987 A1* | 4/2008 | Mao .................. H04L 67/02 719/313 |
| 2008/0155557 A1* | 6/2008 | Bezrukov et al. ............. 719/316 |
| 2009/0193439 A1* | 7/2009 | Bernebeu-Auban et al. . 719/320 |
| 2010/0106768 A1* | 4/2010 | Bernabeu-Auban et al. . 709/203 |
| 2011/0167432 A1* | 7/2011 | Xie et al. ..................... 719/315 |
| 2012/0158911 A1* | 6/2012 | Leiba ..................... H04L 43/50 709/219 |

OTHER PUBLICATIONS

"Importing Adaptive Web Service Models"; SAP Web Dynpro Adaptive Web Service Models; http://help.sap.com/saphelp_nwce10/helpdata/en/44/7d207cbbf75918e10000000a1553f7/content.htm, disclosed by applicant on Jun. 11, 2009.

* cited by examiner

WEB SERVICE INTERACTION IN A DYNAMICALLY EXTENSIBLE BUSINESS APPLICATION

BACKGROUND

Packaged business applications are prevalent in modern information technology. Packaged business applications provide a computer-based user interface that users utilize to perform business functions (e.g., create a ticket, approve a purchase order, update a work order, etc). Many such business applications use business objects to pass data back and forth between a user interface and a persistence layer (e.g., a relational database or XML repository) where data is stored beyond the current session. The business objects of a business application enforce business rules that determine what can or cannot be done with the data embodied within the business objects. The user interface of a business application enables users to perform specific tasks and read or manipulate the data embodied within the business objects.

It is also often necessary for business applications to retrieve, display and consume data that is not normally managed by the native business application. Such data is resident in external applications and can be retrieved using data synchronization, data integration, Application Programming Interfaces (API) or web services.

A web service is a software resource available to a client machine over a network. In a typical scenario, a client machine will invoke a web service by transmitting a request over the network to a server hosting the web service. The server will then execute the web service according to the request made by the client machine, and may transmit a response back to the client machine.

One or more Web services may be used to enrich a business application by integrating data that is external to the application. Nevertheless, developer resources, dedicated development tools, and the authoring of code are traditionally required to design an interface between a packaged business application and a web service.

BRIEF SUMMARY

A method includes dynamically extending a business application while the business application is being executed by a networked web service client device. The extension creates a persistent customizable web service interaction between the business application and a selected web service.

A web service client device includes a processor and memory communicatively coupled to the processor and configured to store executable code for a business application, wherein the executable code for the business application is dynamically extensible at run time by the processor to create a persistent customized web service interaction between the business application and a selected web service available to the web service client device over a network.

A computer program product includes a computer readable storage medium having computer readable program code embodied therewith. The computer readable program code includes computer readable program code configured to dynamically extend a business application while the business application is being executed by a networked web service client device. The extension creates a persistent customized web service interaction between the business application and a selected web service.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods and systems of dynamically extending a business application at run time to create a persistent web service interaction between the business application and a selected web service. The web service interaction may create a policy-based, on-demand, optimized, and context-based integration of the web service into the business application. Advantageously, this web service interaction-based extension may be created by a user during runtime without the use of code.

As used in the present specification and in the appended claims, the term "web service" refers to a software system designed to support interoperable machine-to-machine interaction over a network.

As used in the present specification and in the appended claims, the terms "extend," "extensible," and "extension" refer to the act, ability, and product, respectively, of dynamically modifying a business application during its execution.

As used in the present specification and in the appended claims, the term "web service interaction" refers to a software interface between a business application and a web service.

As used in the present specification and in the appended claims, the term "business application" refers broadly to any software program directed to managing operations or data of an organization.

As used in the present specification and in the appended claims, the term "business object" refers broadly to a software object that is supported by a business application.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
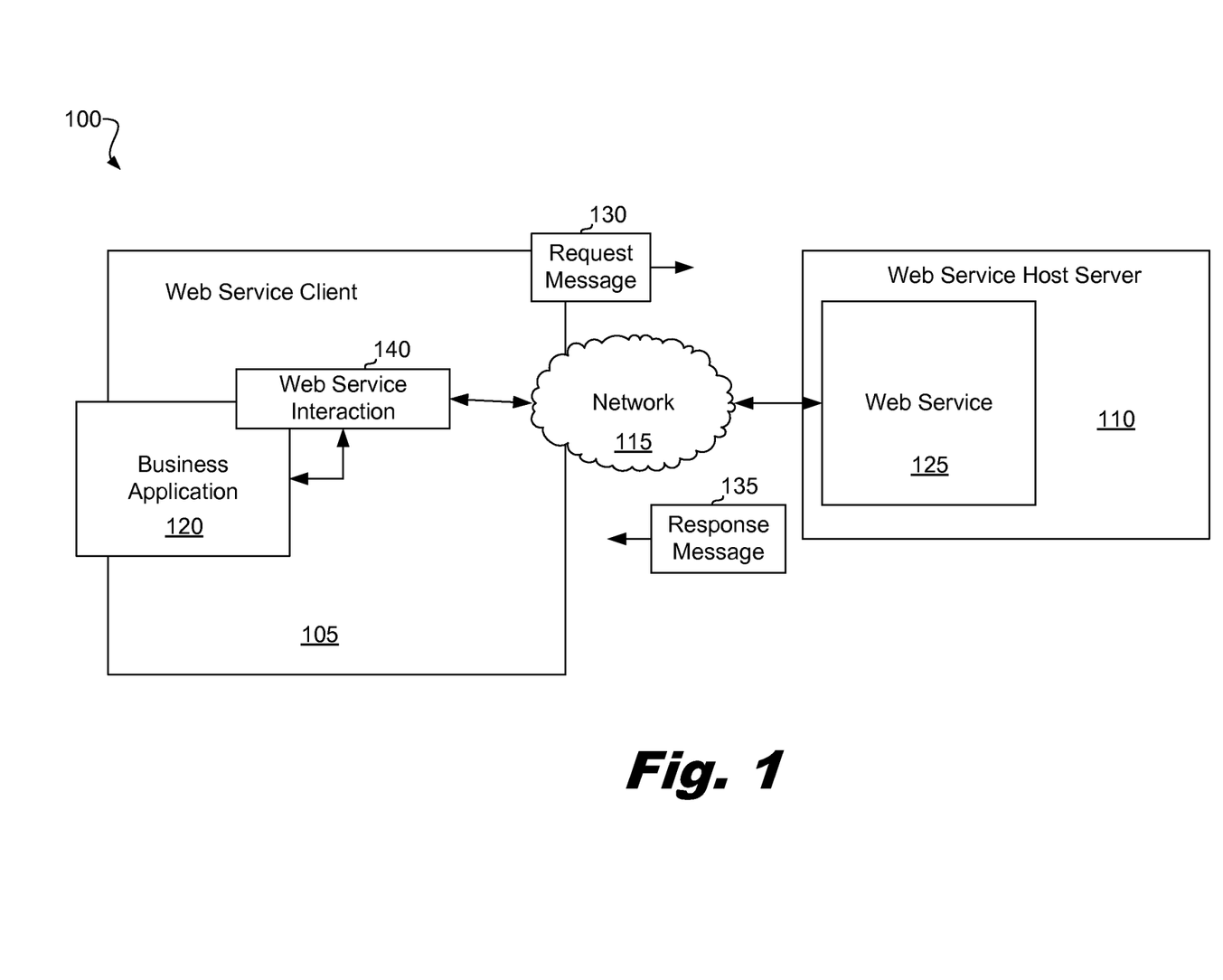
FIG. 1 is a block diagram of an illustrative web service client in communication with a web service host, according to one exemplary embodiment of principles described herein.

With reference now to FIG. 1, a block diagram is shown of an illustrative web service system (100). The system (100) includes a web service client device (105) in communication with a web service host server (110) through a network (115). Each of the web service client device (105) and the web service host server (110) may include a processor, memory communicatively coupled to the processor, and an I/O module configured to manage communications with external devices. The memory associated with the Web service client device (105) may store executable code corresponding to a business application (120). Hence, the Web service client device (105) may run the business application (120) when its processor executes the code in its memory associated with the business application (120). Likewise, the Web service host server (110) may run the Web service (125) by executing the code in its memory associated with the Web service (125).

As described above, Web services can be used to enrich business applications (120) by integrating data that is external to the application. However, the wide variety of web services available, the inherent differences in protocol used to invoke and read the Web services, and the constant creation of new Web services make it very difficult to establish an "out-of-the-box" software interface between a business application (120) and any Web service providing data or services that may be useful to the business application (120).

For example, the Web service (125) implemented by the Web service host server (110) shown in FIG. 1 may be configured to communicate with external processes in the transmission and receipt of XML messages (130, 135), conforming to a format specified in the Web Services Description Language (WSDL) associated with the Web service (125). Despite the potential utility of the Web service (125) to the business application (120), the business application (120) may not have the native ability to consume the Web service (125). Traditionally, business applications (120) are customized to interact with selected web services by a developer who authors code that must be deployed to the device implementing the business application. Often, this process consumes developer resources, dedicated development tools, and may impact the availability of the business application.

Advantageously, the business application (120) of the present example may be extended at run-time to create a customized web service interaction module (140) that generates and recognizes the web service interaction objects associated with the web service (125) such that the web service (125) can be exposed to the business application (120). As such, the business application (120) may be seamlessly extended to interact with any web service. Particularly, the principles of the present specification describe a dynamically extensible business application (120) that enables automatic generation of all artifacts (including user interfaces) to support interaction with a selected web service (125), automatic optimization of the schema underlying the selected web service (125) based on configurable policies, seamlessly binding an invocation of the selected web service into the business application (120) without any manual application customization, and complete context-based interactions with the selected web service (120). Notably, this extension of the business application (120) can be accomplished by a non-developer user in a single session without restarting the business application (120) or terminating a current session of the business application (120).

Figure 2:
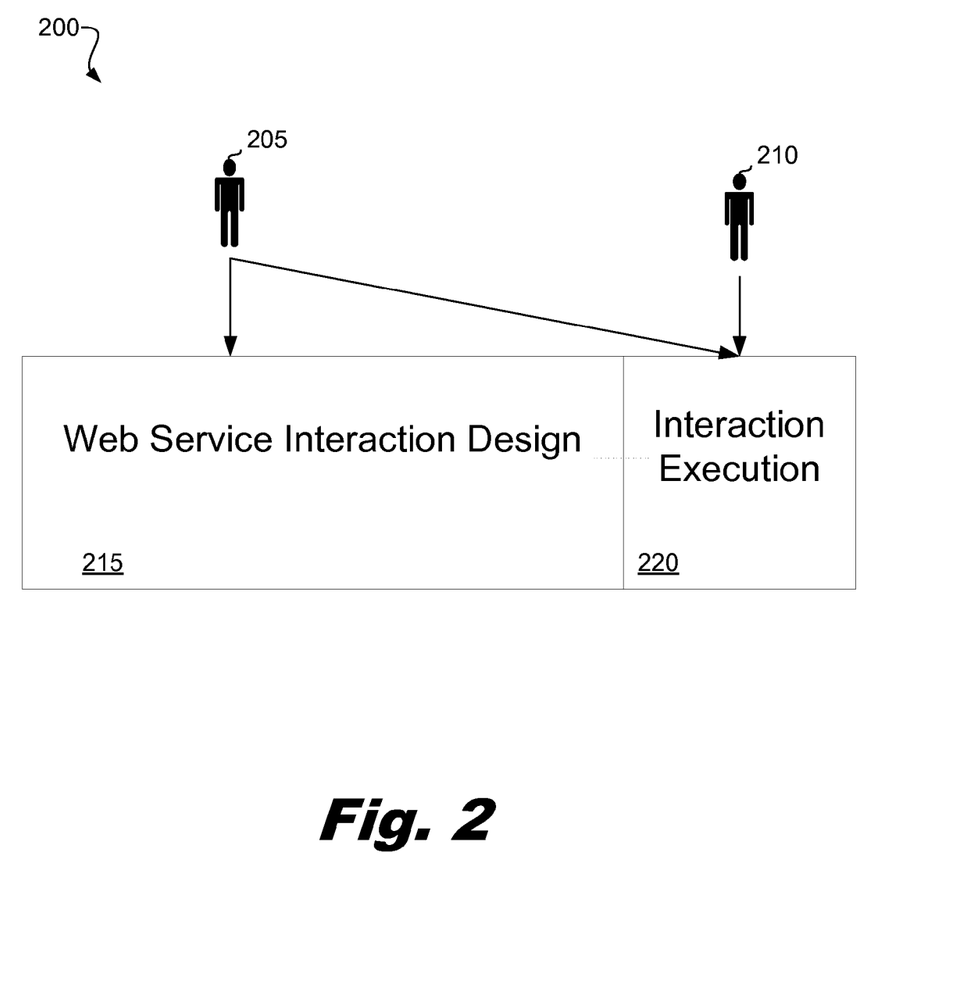
FIG. 2 is a block diagram of an illustrative development sequence of a web service interaction in a dynamically extensible business application, according to one exemplary embodiment of principles described herein.

Referring now to FIG. 2, a block diagram of an illustrative development sequence (200) of a web service interaction extension of a business application (120, FIG. 1) is shown. As presented in FIG. 2, the development sequence (200) may be divided into a design stage (215) and an execution stage (220). Both stages may be carried out during run-time (while the business application (120, FIG. 1) is being executed). A single user (205) may facilitate completion of both the design stage (215) and the execution stage (220). However, once the web service interaction extension has been designed and persistence within the business application (120, FIG. 1) established, any user (205, 210) of the business application (120, FIG. 1) may execute the interaction in a run-time environment and derive the benefits thereof. Additionally or alternatively, the business application (120, FIG. 1) may be configured to execute the web service interaction autonomously as needed after the design stage (215).

The execution of the web service interaction may involve querying the web service, processing the response from the web service, and applying the returned data into the application. At its core, the interaction is a web service invocation. While a raw web service invocation and processing response data can be performed easily, what is non-trivial is the invocation in a business context. With the interaction of the present specification, the web service invocation is initiated from an enhanced application user interface, parameters from the application can be passed in, the request constructed, the service invoked, the response processed and response data displayed in the user interface. Further, the response data can be applied (inserted/updated) into the business application from which the interaction was launched.

Figure 3:
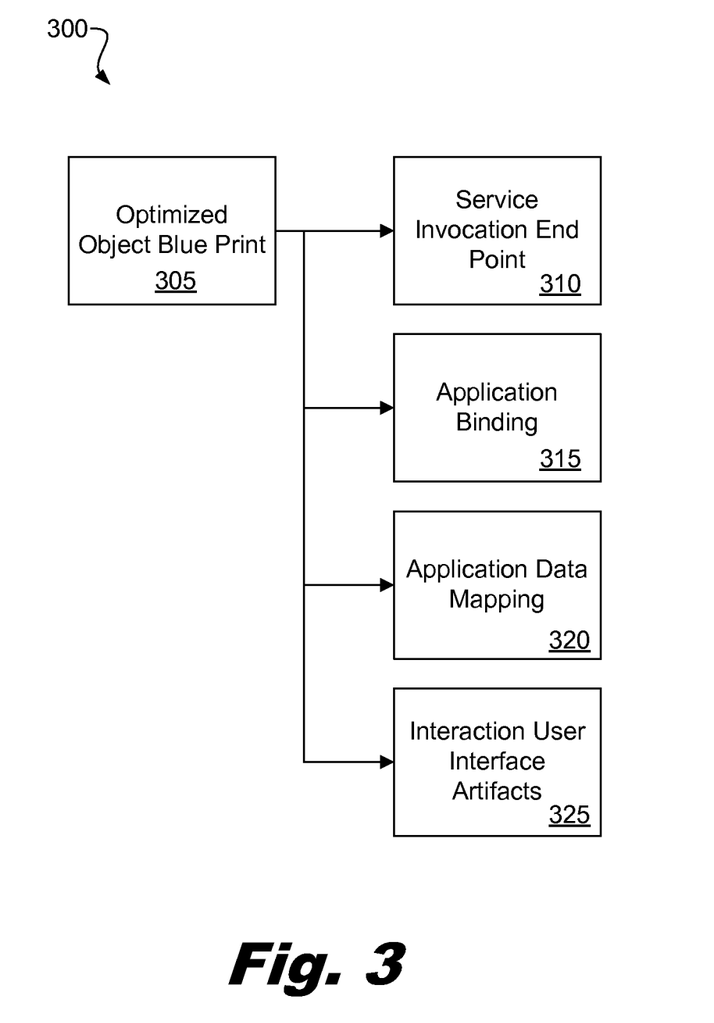
FIG. 3 is a block diagram of an illustrative web service interaction blueprint according to one exemplary embodiment of principles described herein.

Referring now to FIG. 3, a block diagram is shown of an illustrative interaction blueprint (IBP) (300) for a web service interaction extension of a business application (120, FIG. 1). The process of interaction design (215, FIG. 2) may include generating an interaction blueprint (300) for at least one identified operation of the web service specified in the WSDL and underlying schema. The IBP (300) is a design-time artifact that represents the collection of all the software entities (305, 310, 315, 320, 325) of the business application (120, FIG. 1) that must work together to execute the interaction at run-time and their relationship to each other. An optimized object blue print (OBP) (305) artifact represents an optimized form of the web service schemas and is the foundation on which the interaction is built. An optimized object blue print (OBP) (305) comprises a representation of request and response in the form of a hierarchy of web service interaction objects (WSIO) and web service interaction attributes. The WSIO is an encapsulated representation of the web service schema element. An invocation end point artifact (310) may be configured to initiate communication with the web service (125, FIG. 1). An application binding structure artifact (315) may represent the binding between the business objects of the application (120, FIG. 1) and the optimized object blueprint (305), thereby enabling the interaction to be launched and applied from the business application (120, FIG. 1). An application data mapping artifact (320) may be between attributes of a recognized business object of the business application (120, FIG. 1) and elements of the web service request and response schemas. User interface artifacts (325) may include all of the user interface components for executing the interaction, such as a launch menu item or button, an interaction dialog, a tab, and other useful user interface controls.

Figure 4:
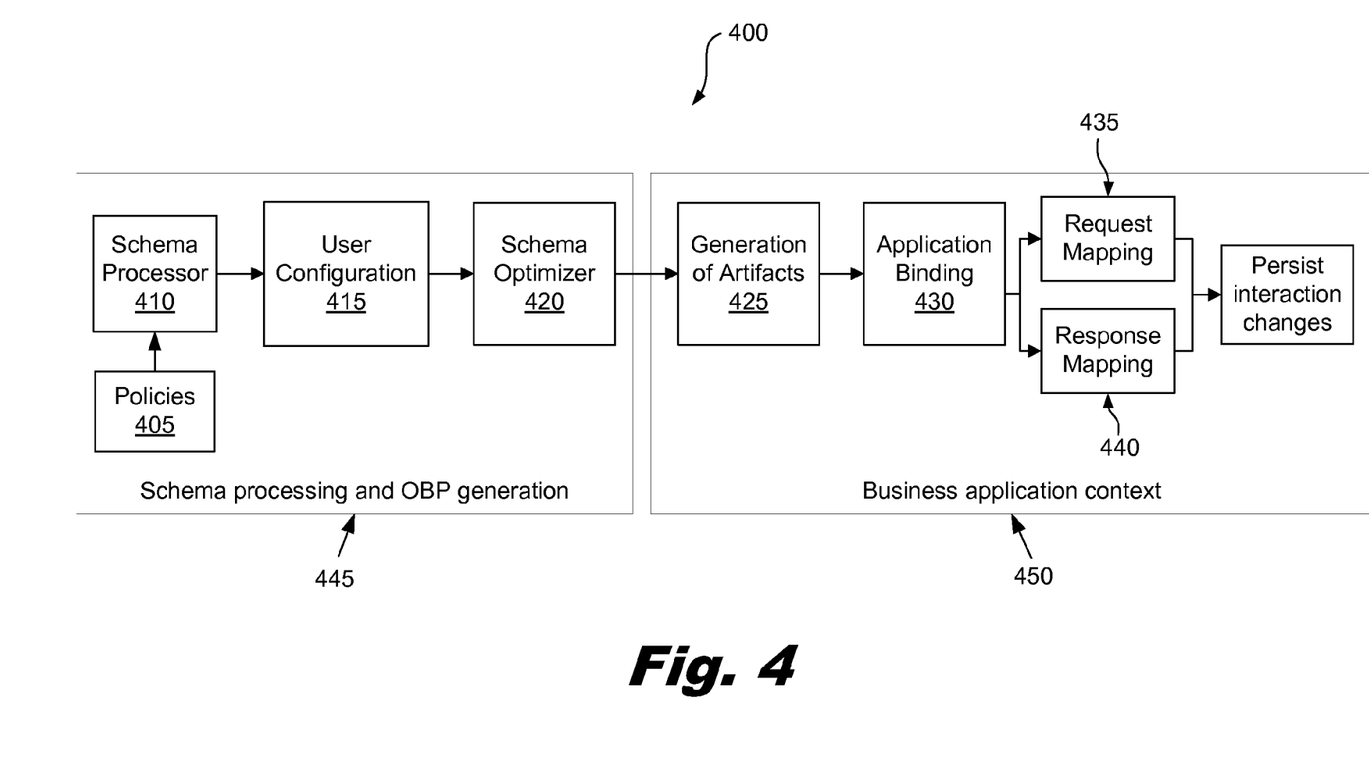
FIG. 4 is a flow diagram of an illustrative web service interaction creation process according to one exemplary embodiment of principles described herein.

Referring now to FIG. 4, a block diagram is shown of an illustrative design process (400) for a web service interaction. As previously described, the design process (400) may be carried out at run-time of the business application (120, FIG. 1) to adapt the business application (120, FIG. 1) to invoke a selected web service (125, FIG. 1) and interpret the response from the web service (125, FIG. 1). The design process (400) may be performed using a combination of user input and data obtained from the web service description language (WSDL) of the selected web service.

As will be recognized by those having ordinary skill in the art, the WSDL of a web service (125, FIG. 1) is typically an XML-based document following a standardized form that describes the web service (125, FIG. 1) and how it is accessed. Generally the WSDL will include one or more XML schema related to specific operations of the web service (125, FIG. 1).

Accordingly, the WSDL of the selected web service may be parsed and analyzed by a schema processor (410) to locate the services available from the web service (125, FIG. 1). Each service may be associated with multiple ports, each of which in turn points to the protocol binding. Each binding points to a service interface (also known as PortType), which lists the available operations for the service endpoint. When an operation is selected, the request and response schema elements for the operation are interpreted and optimized by the schema processor (410) in preparation for generating the Object Blue Print (OBP). The generated Object Blue Print (OBP) will be comprised of a hierarchy of WSIOs. Each WSIO may include attributes (WSIOATTRIBUTE) and a set of children WSIOs. The construction and optimization of this hierachy of WSIOs and WSIOATTRIBUTEs may be performed by applying applicable optimization rules.

It should be noted that in the present example, the schema processor (410) is explained in the context of XML schema conforming to the W3C recommendation, which is well-known in the art and is available at http://www.w3.org. Other schema standards for web services exist which may also be applied to the principles of the present specification.

In certain embodiments, the schema processor (410) may categorize and process schema elements as follows: Any Element (AE), Simple Element (SE), Complex Element (CE), Complex Element with Complex Content (CECC), Complex Element with Mixed Content (CEMC), Complex Element with Simple Content (CESC), and Complex Element with Empty Content (CEEC). Exemplary schema processing and optimization rules for simple elements (SE) found in a schema are described below in Table 1. Each rule is given a name for identification purposes (e.g., SER01). The rules enumerated below are merely illustrative. In alternative embodiments, this rule set may be modified or replaced with an alternate set of processing rules.

In certain embodiments, the schema processor (405) may categorize and process schema elements as follows: Any Element (AE), Simple Element (SE), Complex Element (CE), Complex Element with Complex Content (CECC), Complex Element with Mixed Content (CEMC), Complex Element with Simple Content (CESC), and Complex Element with Empty Content (CEEC). Exemplary schema processing and optimization rules for simple elements (SE) found in a schema are described below in Table 1. Each rule is given a name for identification purposes (e.g., SER01). The rules enumerated below are merely illustrative. In alternative embodiments, this rule set may be modified or replaced with an alternate set of processing rules.

TABLE 1

Simple Element Rules

[SER01]

Any SE with maxOccurs = 1 and is a child to a CE is considered a WSIOATTRIBUTE. If minOccurs = 1 the SE is considered a required attribute and if minOccurs = 0 the SE is considered optional. The data type for the WSIOATTRIBUTE is dictated by the data type of the SE.

[SER02]

Any SE with maxOccurs = unbounded is considered as a WSIO with itself as the only WSIOATTRIBUTE. The data type for the WSIOATTRIBUTE is dictated by the data type of the SE.

[SER03]

Any SE with maxOccurs = N where N represents a positive integer (bounded) is managed using the occurrence threshold policy [IOTP]. This policy specifies the value of N above which an SE will be considered as a WSIO and less-than-equal to which it will be considered to represent N unique WSIOATTRIBUTE each with unique names. The data type for the WSIOATTRIBUTE is dictated by the data type of the SE.

[SER04]

Any SE which represents the document root (root element for the operation request or response) is considered as a WSIO with itself as the only WSIOATTRIBUTE. The data type for the WSIOATTRIBUTE is dictated by the data type of the SE.

A WSIO which corresponds to a SE will never have any children WSIO.

Similarly, exemplary schema processing and optimization rules for complex elements (SE) found in a schema are described below in Table 2:

TABLE 2

Complex Element Rules

[CESCR01]

Any CESC which has maxOccurs = 1 and which is a child to a CE will be de-normalized to N + 1 WSIOATTRIBUTEs of the parent WSIO where N is the number of XML attributes the CESC contains. Each CESC attribute will be represented by a WSIOATTRIBUTE, the type of which will be dictated by the schema attributes type. The actual element value is represented by another WSIOATTRIBUTE. The type of this latter WSIOATTRIBUTE is dictated by the type of the simple content. If minOccurs = 0 then CESC content WSIOATTRIBUTE and the WSIOATTRIBUTEs generated from the CESC optional attributes are considered as optional. The WSIOATTRIBUTEs generated from the CESC required attributes are considered optional with the "depends" attribute set to the WSIOATTRIBUTE name representing the CESC content. If minOccurs = 1 then the WSIOATTRIBUTE which represents the CESC content is considered as required. All WSIOATTRIBUTEs with corresponding CESC attributes with use = optional will be considered as optional. All WSIOATTRIBUTEs with corresponding element attributes with use = required will be considered as required.

[CESCR02]

Any CESC with maxOccurs = unbounded will be considered as a WSIO with N + 1 WSIOATTRIBUTEs where N is the number of XML attributes the CESC contains. Each of the CESC attribute will be represented by a WSIOATTRIBUTE, the type of which will be dictated by the attributes type. The actual element value is represented by another WSIOATTRIBUTE. The type of this WSIOATTRIBUTE is dictated by the type of the simple content. The occurrence indicator for the CESC has no role to play for determining whether a WSIOATRRIBUTE is required or optional. WSIOATTRIBUTEs mapped from CESC attributes with use = optional are considered optional and those with use = required are considered required. For the WSIOATTRIBUTE representing the simple content for CESC the schema analyzer looks for the simple content type to determine if it is required or optional. For example, a Boolean type would indicate that the WSIOATRIBUTE is required.

[CESCR03]

Any CESC with maxOccurs = N where N represents a positive integer (bounded) is driven by the occurrence threshold policy (IOTP). This policy will dictate the value of N above which a CESC will be considered as a WSIO and less-than-equal to which it will be considered to represent N unique set of CESC with maxOccurs = 1 which will be de-normalized based on the previous policy.

[CESCR04]

Any CESC which represents the document root [root element for the operation request or response] is considered as a WSIO with N + 1 WSIOATTRIBUTEs where TABLE 2-continued Complex Element Rules (N is the number of XML attributes the CESC contains (as per rule CESC 02) and the
actual element value is represented by another WSIOATTRIBUTE) + 1.
A WSIO which corresponds to a CESC will never have any children WSIO.
[CEECR01]

Any CEEC will follow all the rules for CESC with the exception that the
WSIOATTRIBUTE to represent the content of the CE would be a read-only attribute
with a default value of null (as it has empty content). This is a generated
WSIOATTRIBUTE and would have no value for the xmlLocation attribute (as it does
not map to any element/attribute in the XML document)
A WSIO which corresponds to a CEEC will never have any children WSIO.
[CECCR01]

Any CECC is considered as a WSIO. The attributes of the CECC are considered to be
WSIOATTRIBUTEs of the WSIO. The WSIO may have other WSIOATTRIBUTEs
generated from applying the SE, CESC and CEEC rules.
A WSIO which corresponds to a CECC may or may not have children WSIOs.
[CEMCR01]

Any CEMC is considered as a WSIO. The attributes of the CECC are considered to
be WSIOATTRIBUTEs of the WSIO. An extra WSIOATTRIBUTE [text data type]
is created to correspond to the simple content of the CEMC. The WSIO may have
other WSIOATTRIBUTEs generated from applying the SE, CESC and CEEC rules.
[AER01]

Any elements and attributes are handled through the Any Element Policy [IAEP]
which allows users to specify a schema for that element. The policy can be used to
specify the XPath location of the any element in the schema document (for the WSDL
service operation) and the schema element definition that will be used to substitute
this any element in that location. The processor first resolves these Any Elements
based on the IAEP and then follows the SE* and the CE* rules to generate the
WSIOs/WSIOATTRIBUTEs. Any attributes will be resolved the exact same way. If
the processor finds no policy for the any element or the any attribute the processor
would:
1. Ignore if any element or the any attribute they are optional.
2. Throw an error if the any element or the any attribute is required The WSIO hierarchy can be further optimized by the schema processor (410) by applying the following exemplary rules:

TABLE 3

Rules for Optimization

There cannot be any WSIO which has a 1:1 relationship with its parent WSIO
implemented by WSIOR01:
[WSIOR01]

Any child WSIO having maxoccurs = 1 should merge-up with its parent WSIO. The
merge-up operation is performed by moving all the WSIOATTRIBUTEs of the WSIO to
its parent WSIO and making all the direct children of the WSIO direct children of the
parent WSIO. This operation results in the child WSIO having no WSIOATTRIBUTEs
and no children WSIOs eventually leading to the removal of the child WSIO.
There cannot be any WSIO with 0 WSIOATTRIBUTEs. The following rules would
address how the processor handles those WSIOs with no attributes of its own
implemented by WSIOR02, WSIOR03 and WSIOR04:
[WSIOR02]

If the WSIO root has no attributes and only one WSIO child then the child is merged up
to the parent effectively removing the root WSIO.
[WSIOR03]

If the root WSIO has no WSIOATTRIBUTEs and only WSIO children [>1] then the
processor will add a read-only WSIOATTRIBUTE for the WSIO with a default value of
null.
[WSIOR04]

For any non-root WSIO with maxOccurs = unbounded having only WSIO children and no
WSIOATTRIBUTE the processor will add a read-only WSIOATTRIBUTE for the WSIO
with a default value of null.

These rules enumerated in Table 3 may be applied recursively until the optimized WSIO hierarchy is obtained.

The application of these rules to the underlying request and response schemas of the desired web service operation will minimize the number of WSIOs in preparation for the generation of an OBP which arranges the WSIOs into a hierarchical structure.

The schemas may be further optimized by applying policies (405, FIG. 4), or design-time declarations. Policies (405, FIG. 4) may be defined globally so that they apply to all web service interactions of a business application (120, FIG. 1). Additionally or alternatively, policies (405, FIG. 4) may be defined for specific web service interactions. Examples of policies (405, FIG. 4) that may be applied to the OBP are displayed below in Table 4. It should be understood that the policies (405, FIG. 4) summarized in Table 4 are merely exemplary, and other policies may also be applied as may suit a particular application of the principles described herein.

TABLE 4

Policies

| Policy | Purpose |
| --- | --- |
| Interaction Object-Attribute Naming Policy (IOANP) | Object Attribute naming policy (IOANP) dictates how the XML element and attribute names in the schema are mapped to the WSIO and WSIOATTRIBUTE name. This policy can be used to specify the maximum allowed length for an attribute name as well as the prefix for WSIO and WSIOATTRIBUTE names derived from XML elements and attributes. |
| Interaction Attribute Exclusion Policy (IATEP) | Attribute exclusion policy (IATEP) dictates which XML attributes can be excluded from the OBP. By default all attributes are included as WSIOATTRIBUTEs in the OBP. This policy can be used to ignore all attributes which are not required as per the schema or just those attributes that are not required for the interaction and have a default value. The policy does not apply to required attributes. |
| Interaction Data Typing Policy (IDTP) | Data typing policy [IDTP] dictates how data types are assigned to each WSIOATTRIBUTE. The default policy maps schema data types to entity attribute data types using JAXB standard data type mapping. For example, an xsd:integer and xsd:positiveInteger would both map to WSIOATTRIBUTE data type Integer. This policy can be used to make the system recognize xsd:positiveInteger as a WSIOATTRIBUTE separate type than xsd:integer. This can be effectively used for those systems that support stricter data typing. |
| Interaction Occurrence Threshold Policy (IOTP) | A customizable policy that dictates how a distinction will be made whether a schema simple type will remain a WSIA or be promoted to a WSIO |
| Interaction Any Element Policy (IAEP) | Any element policy [IAEP] handles any element and attributes. This policy allows users to specify a schema for that element. The policy can be used to specify the XPath location of the any element in the schema document (for the WSDL service operation) and the schema element definition that will be used to substitute this any element in that location. |

After the schema processor (410) has been executed on the schema in the WSDL of the web service (125, FIG. 1), a user configuration (415) of the web service interaction may occur. This user configuration may be optional in certain embodiments. In this step of the design process (400), a user may consciously discard optional elements of the request or response schema if they are irrelevant to the interaction being designed. The removal of these elements may simplify the interaction as well as help the user focus on key data from the web service (125, FIG. 1).

Following the optional user configuration step (410) of the process (400), a schema optimizer (420) may further reduce and optimize the WSIOs of the schemas. In certain embodiments, this optimization may be carried out in a series of three passes, each of which applies a specific type of optimization to the structure of the OBP. For example, the first pass may apply Rule WSIOR01 of Table 3 to the WSIOs, the second pass may apply Rules WSIOR02 and WSIOR03 to the WSIOs, and the third pass may apply Rule WSIOR03 to the WSIOs. Thus, the schema optimizer (420) may further reduce and optimize the WSIO hierarchy of the OBP.

Once the WSIOs have reached their final, optimized number and hierarchy, flow may move to an artifact generation stage (425), where each of the artifacts of the interaction blueprint (300, FIG. 3) is generated, including the business objects and user interfaces native to the business application (120, FIG. 1).

Binding routines (430) may be run on the artifacts. Binding is the mechanism by which the interaction with the web service is glued to the business application (120, FIG. 1) in a fully usable manner. Binding is characterized by the choice of business application and the launch point of the interaction from within the chosen business application (120, FIG. 1).

Mapping may be between a set of related WSIOs that represent the web service (125, FIG. 1) and a set of business objects native to the business application (120, FIG. 1). Every business object and WSIO object includes attributes, and the mapping is configured at the attribute level. In certain embodiments, the mapping may be performed interactively by a user through a user interface.

In a request mapping routine (435), one or more business object is mapped to a WSIO of the OBP. A business object of the business application (120, FIG. 1) may be designated as the Interaction Root which is used as a starting object for the request and response mapping. All other source business objects should be related to the root business object. In mapping, cardinality may be driven by the request WSIO root object. Thus, if the cardinality of the request WSIO root object is unbounded, a user may have the choice of either mapping a single application primary business object to a single instance of the WSIO object or to a set of WSIO objects. If the cardinality of the WSIO root object is single, then only one WSIO object can exist for each application primary object.

Table 5 below provides exemplary rules that may be applied during a request binding routine (435):

TABLE 5

Request Mapping Rules

[REQMR01]

There can be only one source object for a Request WSIO in OBP. The mapping is driven by cardinality of source object; that is, the number of WSIO records will be the same as the number of records in the Source Object.

[REQMR02]

Source Object for a WSIO can be the same as Source Object for that WSIO's parent. For a WSIO and its parent sharing the same Source Object, only one WSIO record will be created for each such WSIO parent record.

[REQMR03]

Source Object for a WSIO should be related to Source Object for that WSIO's parent. The number of WSIO records will be equal to number of records in Source Object set.

[REQMR04]

All attributes in the Source Object are available for mapping.

[REQMR05]

Any related object (from current source object) attribute can be mapped to current WSIO attribute.

In a response mapping routine (440), the mapping occurs between at least one WSIO received from the web service (125, FIG. 1) and at least one target business object of the business application (120, FIG. 1). A business object of the business application (120, FIG. 1) may be designated as an Interaction Root, used as a starting object to apply the data from the WSIO back to the business application (120, FIG. 1). In certain embodiments, the Interaction Root may be a Primary Object of the business application. In such cases, all WSIO objects received from the web service (125, FIG. 1) may be added to the Primary Object. Alternately, a business object related to an application Primary Object may be the Interaction Root. In this case, all keys of the Interaction Root will be mapped to the corresponding attributes of the WSIO in the response OBP.

Table 6 below provides exemplary rules that may be applied during a response binding routine (440):

TABLE 6

Response Mapping Rules

[RESMR01]

The can be only one WSIO in Response OBP for a Target Object. Driven by cardinality of WSIO: number of records in Target Object will be the same as number of records in the WSIO Response OBP.

[RESMR02]

One WSIO in Response OBP can be mapped to multiple related Target Objects. For Target Source Object and its parent sharing the same WSIO in Response OBP, only one Target record will be created for each such Target parent record.

[RESMR03]

Target Object for a WSIO in Response OBP should be related to Target Object for that WSIO's parent. Number of records in Target Object Set will be equal number of WSIO records.

[RESMR04]

All attributes in the WSIO in Response OBP are available for mapping

TABLE 6-continued

Response Mapping Rules

[RESMR05]

Any related object [from current WSIO] attribute can be mapped to current Target Object attribute.

Figure 5:
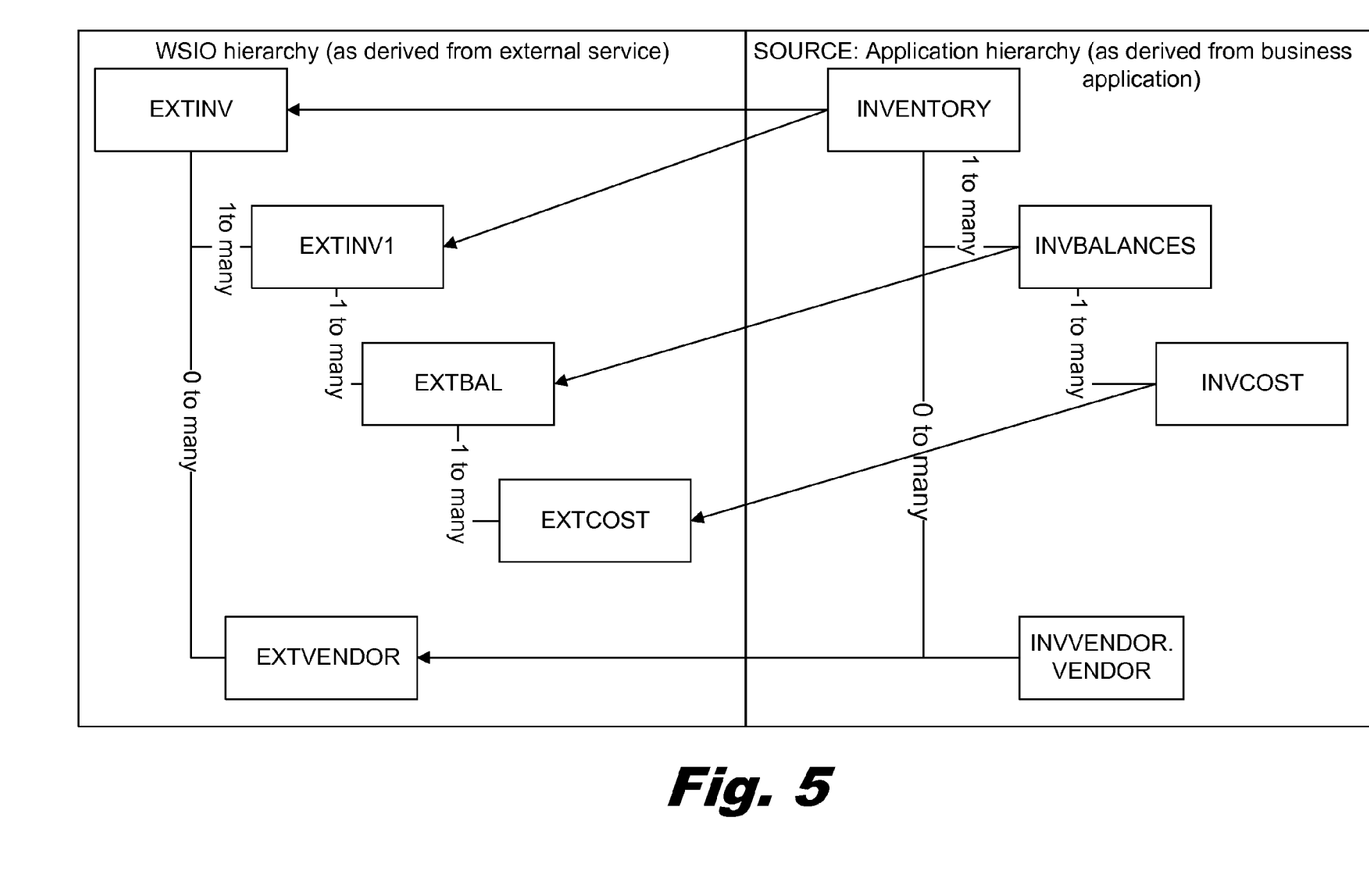
FIG. 5 is a block diagram of an illustrative request mapping process between a business object recognized by a business application and a web service interaction object, according to one exemplary embodiment of principles described herein.
Figure 6:
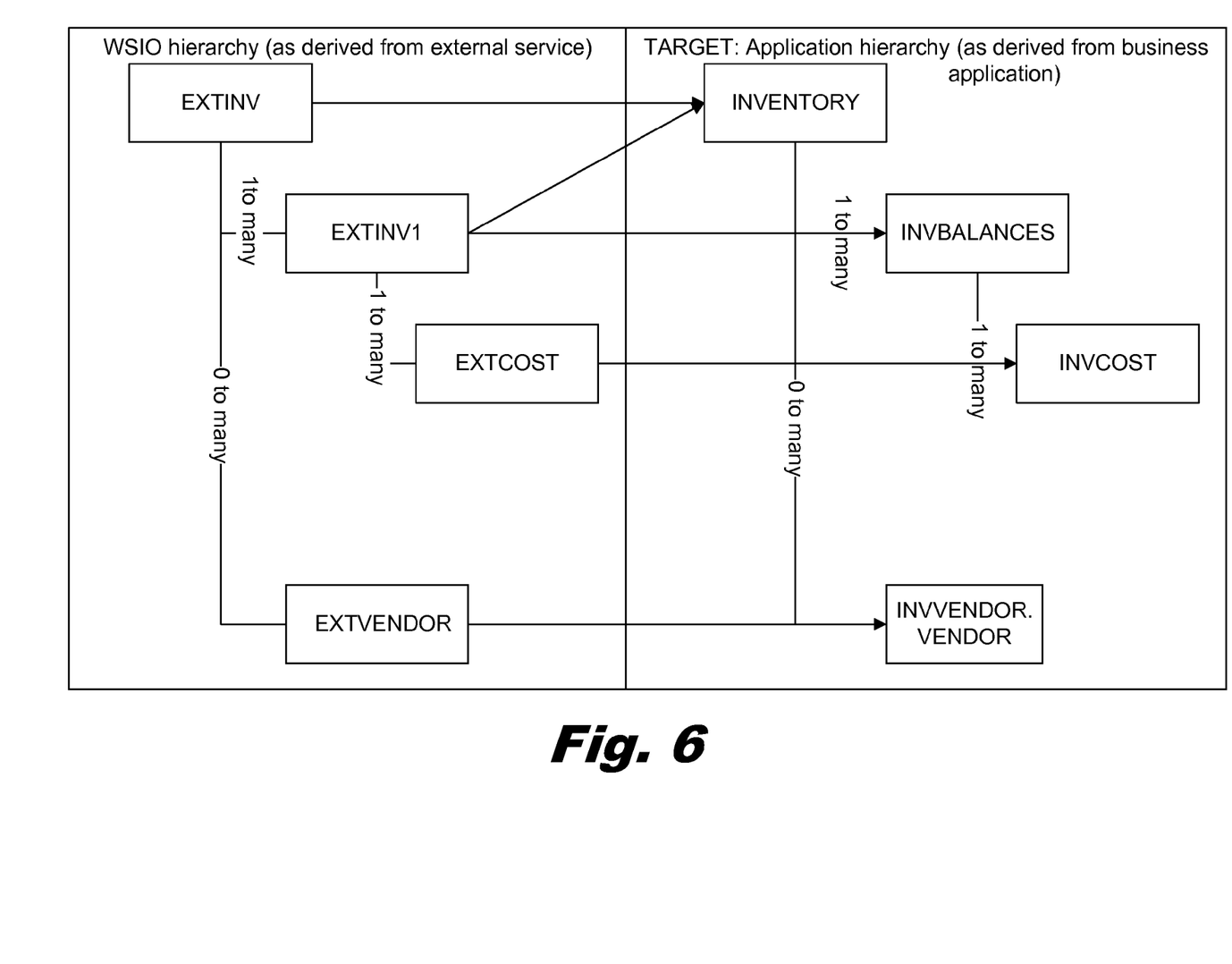
FIG. 6 is a block diagram of an illustrative response mapping process between a business object recognized by a business application and a web service interaction object, according to one exemplary embodiment of principles described herein.

FIG. 5 and FIG. 6 illustrate, respectively, exemplary request and response mappings between OBP WSIO mappings corresponding to the web service (125, FIG. 1) and business objects of the business application (120, FIG. 1) in the context of an inventory web service (125, FIG. 1).

Returning to FIG. 4, once the request and response bindings have been configured, the persistence of the web service interaction extension artifacts may be established in the business application (120, FIG. 1) to allow the interaction to be executed as needed in the future. The persistence may be generated automatically without additional user intervention.

Figure 7:
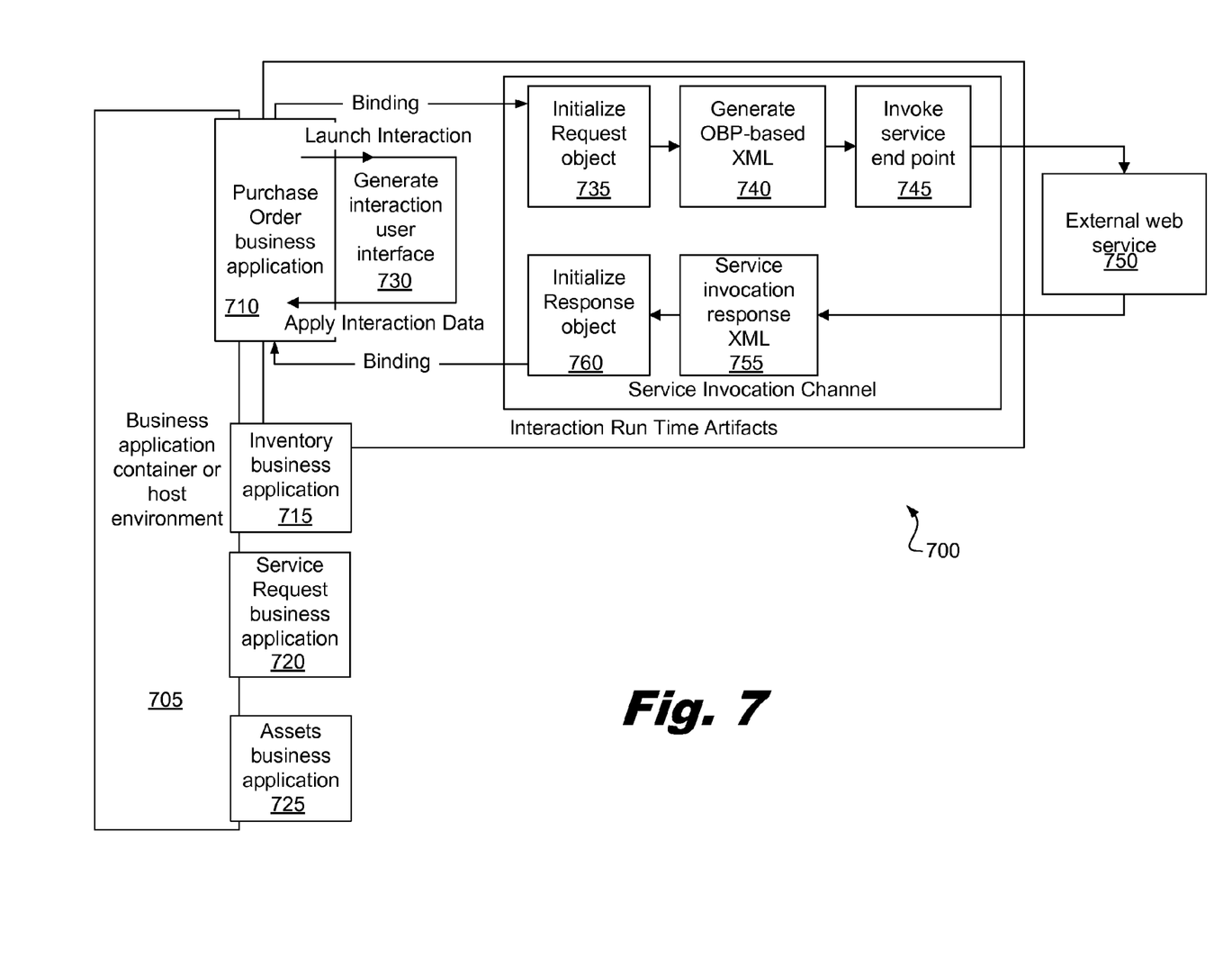
FIG. 7 is a block diagram of an illustrative execution sequence of an illustrative web service interaction module of an illustrative business application, according to one exemplary embodiment of principles described herein.

FIG. 7 is a block diagram of the execution sequence of an illustrative web service interaction extension of a business application (120, FIG. 1) according to one embodiment of the principles described herein. Once the interaction design has been saved, it can be executed by any user granted execution privileges. The run-time execution engine has the capability to choreograph the various interaction blueprint artifacts (305, 310, 315, 320, 325, FIG. 3) and execute the interaction on behalf of the user.

In the present example, a business application container or host environment (705) hosts several business applications (710, 715, 720, 725). The web service interaction execution sequence is shown for a purchase order business application (710). In the sequence, the purchase order business application (710) launches an interaction through a user interface (730) automatically generated without user intervention in the business application (710). The user interface may have been originally configured when the interaction was designed. Accordingly, the request binding artifact is executed to bind data from one or more business objects of the business application (710) to one or more WSIO request objects. A request object is initialized (735) and OBP-based XML (740) is generated and transmitted by the service endpoint artifact (745) to the web service (750), which responds with Service Invocation Response XML (755). The Service Invocation Response XML data is stored in an initialized response WSIO object (760), which is mapped by the response binding artifact to one or more business objects of the business application (710).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of binding a web service to a business application, comprising dynamically extending a business application by generating an extension of said business application while said business application is being executed by a networked web service client device, wherein said extension creates a persistent customizable web service interaction between said business application and a selected web service;
   wherein dynamically extending said business application comprises:
      analyzing a web services description language (WSDL) associated with said selected web service to identify at least one operation;
      generating an interaction blueprint for said at least one identified operation of said web service specified by said WSDL from said analysis of said WSDL, wherein said interaction blueprint lists software entities of said business application that enable said web service interaction at runtime between said business application and said selected web service and relationships among those software entities;
   wherein each said interaction blueprint comprises:
      an object blueprint comprising a hierarchy of web service interaction objects derived from a schema for said operation in said WSDL;
      an endpoint artifact comprising connectivity details for said web service;
      an application binding structure artifact that associates the said web service interaction with the chosen business application; and
      a mapping that maps components of said web service interaction objects to corresponding components of business objects recognized by said business application.

2. The method of claim 1, wherein dynamically extending said business application further comprises:
   receiving input from a user of said business application discarding optional elements of the interaction blueprint to produce an optimized blue print.

3. The method of claim 1, wherein dynamically extending said business application further comprises natively generating in said business application said interaction business objects of said object blueprint.

4. The method of claim 1, wherein said business objects are native to said business application.

5. The method of claim 1, wherein dynamically extending said business application further comprises generating a user interface component of said business application to allow a user to execute said interaction extension.

6. The method of claim 1, wherein dynamically extending said business application is performed during execution of said business application and without terminating or restarting said business application.

7. A web service client device, comprising:
   a processor; and
   memory communicatively coupled to said processor and configured to store executable code for a business application;
   wherein said executable code for said business application is dynamically extensible at run time by said processor to create a persistent customizable web service interaction between said business application and a selected web service available to said web service client device over a network;
   said executable code comprising a schema processor for receiving and analyzing a web services description language (WSDL) associated with said selected web service to generate an interaction blueprint for said at least one identified operation of said web service specified by said WSDL from said analysis of said WSDL;
   wherein each said interaction blueprint comprises:
      an object blueprint comprising a hierarchy of web service interaction objects derived from a schema for said operation in said WSDL;
      an endpoint artifact comprising connectivity details for said web service;
      an application binding structure artifact that associates the said web service interaction with the chosen business application; and
      a mapping that maps components of said web service interaction objects to corresponding components of business objects recognized by said business application.

8. The web service client device of claim 7, wherein said processor is configured to dynamically extend said executable code for said business application at run time by:
   implementing said interaction blueprint for said at least one identified operation of said web service specified by said WSDL from said analysis of said WSDL.

9. The web service client device of claim 8, wherein said processor is further configured to natively generate in said business application said interaction business objects of said object blueprint.

10. The web service client device of claim 8, wherein said business objects are native to said business application.

11. The web service client device of claim 7, wherein said processor is further configured to generating a user interface component of said business application to allow a user to execute said interaction extension.

12. The web service client device of claim 7, wherein said web service interaction can be used to dynamically extend a plurality of business applications to interface with said web service.

13. The web service client device of claim 7, wherein said processor is configured to receive input from a user of said business application, said user input discarding optional elements of a request or response schema associated with said selected web service from said persistent customizable web service interaction.

14. The web service client of claim 7, wherein said executable code for said business application is dynamically extensible at run time by said processor to create a persistent customizable web service interaction between said business application and a selected web service without terminating or restarting said business application.

15. A computer program product, the computer program product comprising:
  a non-transitory computer readable storage medium having computer readable program code embodied therewith, the computer readable program code comprising:
  computer readable program code configured to dynamically extend a business application by generating an extension of said business application while said business application is being executed by a networked web service client device, wherein said extension creates a persistent customizable web service interaction between said business application and a selected web service;
  said computer readable program code further configured to:
    analyze a web services description language (WSDL) associated with said selected web service to identify at least one operation; and
    generate an interaction blueprint for said at least one identified operation of said web service specified by said WSDL from said analysis of said WSDL, wherein said interaction blueprint lists software entities of said business application that enable said web service interaction at runtime between said business application and said selected web service and relationships among those software entities;
  wherein each said interaction blueprint comprises:
    an object blueprint comprising a hierarchy of web service interaction objects derived from a schema for said operation in said WSDL;
    an endpoint artifact comprising connectivity details for said web service;
    an application binding structure artifact that associates the said web service interaction with the chosen business application; and
    a mapping that maps components of said web service interaction objects to corresponding components of business objects recognized by said business application.

16. The computer program product of claim 15, wherein dynamically extending said business application further comprises:
  computer readable program code configured to receive input from a user of said business application discarding optional elements of the interaction blueprint to produce an optimized blue print.

17. The computer program product of claim 15, wherein said web service interaction can be used to dynamically extend a plurality of business applications to interface with said web service.

* * * * *